(12) United States Patent
Donofrio et al.

(10) Patent No.: US 7,676,535 B2
(45) Date of Patent: Mar. 9, 2010

(54) ENHANCED FLOATING-POINT UNIT FOR EXTENDED FUNCTIONS

(75) Inventors: David D. Donofrio, Benicia, CA (US); Xuye Li, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1194 days.

(21) Appl. No.: 11/236,984

(22) Filed: Sep. 28, 2005

(65) Prior Publication Data

US 2007/0073798 A1 Mar. 29, 2007

(51) Int. Cl.
*G06F 7/38* (2006.01)
(52) U.S. Cl. .................... 708/495; 708/523
(58) Field of Classification Search ......... 708/495–514, 708/523
See application file for complete search history.

(56) References Cited

U.S. PATENT DOCUMENTS

| | | | | |
|---|---|---|---|---|
| 5,996,066 | A * | 11/1999 | Yung | 712/221 |
| 6,697,832 | B1 | 2/2004 | Kelley et al. | |
| 2003/0101206 | A1* | 5/2003 | Graziano et al. | 708/277 |

OTHER PUBLICATIONS

Pineiro, J. A., et al., "High-Speed Function Approximation Using a Minimax Quadratic Interpolator", IEEE Trans. on Comp., IEEE Service Center, Los Alamitos, CA, vol. 54, No. 3, Mar. 2005.
Oberman, S. F. et al., "A High-Performance Area-Efficient Multifunction Interpolator" Computer Arithmetic, 2005. Arith-17 2005. 17th IEEE Symp. on Cape Cod, MA, Jun. 27-29, 2005.
Pineiro, J. A. et al., "Faithful Powering Computation Using Table Look-Up and a Fused Accumulation Tree", Proc. 15th IEEE Symp. on Comp. Arithmetic. Vail. Co. Jun. 11-13, 2001.
Montoye, R.K., et al., "Design of the IBM RISC System/6000 Floating-Point Execution Unit", IBM J. of Research and Dev., International Business Machines Corporation, vol. 34, No. 1, Jan. 1990.

* cited by examiner

*Primary Examiner*—Tan V Mai
(74) *Attorney, Agent, or Firm*—Blakely, Sokoloff, Taylor & Zafman LLP

(57) ABSTRACT

An embodiment of the present invention is a technique to perform floating-point operations. A floating-point (FP) squarer squares a first argument to produce an intermediate argument. The first and intermediate arguments have first and intermediate mantissas and exponents. A FP multiply-add (MAD) unit performs a multiply-and-add operation on the intermediate argument, a second argument, and a third argument to produce a result having a result mantissa and a result exponent. The second and third arguments have second and third mantissas and exponents, respectively.

20 Claims, 10 Drawing Sheets

ENHANCED FLOATING-POINT UNIT FOR EXTENDED FUNCTIONS

BACKGROUND

1. Field of the Invention

Embodiments of the invention relate to the field of microprocessors, and more specifically, to floating-point units.

2. Description of Related Art

Use of floating-point (FP) operations is becoming increasingly prevalent in many areas of computations such as three-dimensional (3-D) computer graphics, image processing, digital signal processing, weather predictions, space explorations, seismic processing, and numerical analysis. Specially designed floating-point units have been developed to enhance FP computational power in a computer system. Many of FP applications involve computations of extended functions. Examples of extended functions are trigonometric functions, exponential and logarithmic functions, square root, reciprocal square root, inverse, divide, and power functions, etc.

Existing techniques to compute FP extended functions have a number of drawbacks. These techniques range from interpolations of values obtained from a table to iterative algorithms such as the Coordinate Rotation Digital Computer (CORDIC) technique. These techniques may require specialized hardware with dedicated circuits. They are typically expensive and not flexible to accommodate a wide range of extended functions.

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1A:
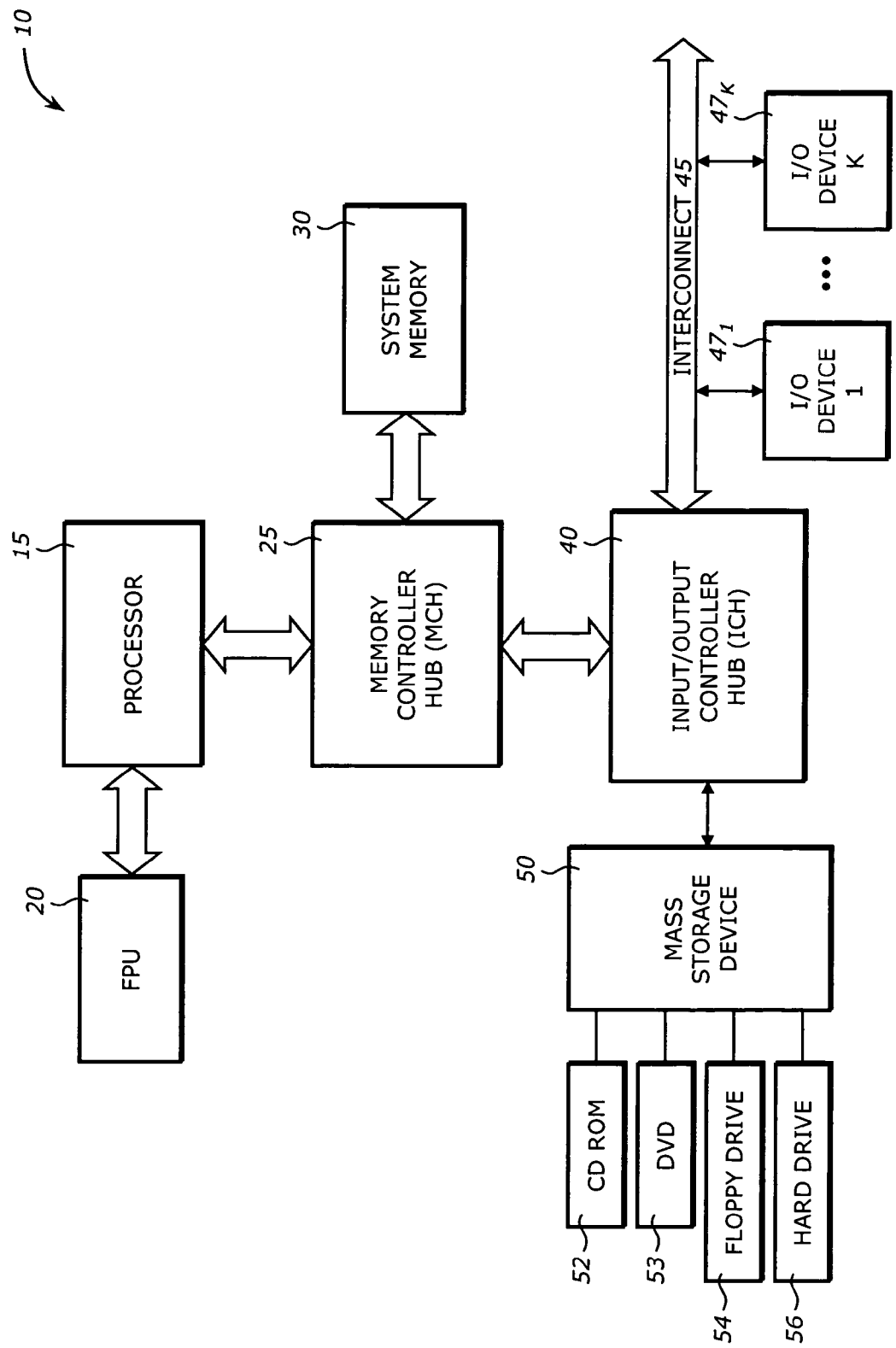
FIG. 1A is a diagram illustrating a processing system in which one embodiment of the invention can be practiced.

An embodiment of the present invention is a technique to perform floating-point operations. A floating-point (FP) squarer squares a first argument to produce an intermediate argument. The first and intermediate arguments have first and intermediate mantissas and exponents. A FP multiply-add (MAD) unit performs a multiply-and-add operation on the intermediate argument, a second argument, and a third argument to produce a result having a result mantissa and a result exponent. The second and third arguments have second and third mantissas and exponents, respectively In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

One embodiment of the invention is a technique to compute FP extended functions efficiently. The FP extended functions include at least trigonometric functions and algebraic functions such as reciprocation, square root, and reciprocation of square root. The computation of the extended function is based on polynomial approximation using the basic multiply-add (MAD) instruction which computes an expression of the form $Y = A \times B + C$. The computation of algebraic functions may be done using the Newton-Raphson iterative method.

A typical polynomial approximation may be divided into three phases: a range reduction phase, an approximation phase, and a reconstruction phase. The range reduction phase converts an argument to a value that is confined in a reduced range. The approximation phase performs the polynomial approximation of the function of the range reduced argument. The reconstruction phase composes the final result with predefined constant or constants to restore the original range. Typically, the range reduction and reconstruction phases are straightforward and may be implemented efficiently. They may include simple masking, comparison, or low-order polynomial evaluation. The approximation phase is the most time-consuming phase because the order of the polynomial may be quite high (e.g., greater than 20).

In the approximation phase, Horner's rule may be employed to factor out the multiply-and-add expressions, reducing the number of multiplications. For example, a fourth order polynomial $y = ax^4 + bx^3 + cx^2 + dx + e$ may be evaluated as:

$$y = (((ax+b)x+c)x+d)x+e \quad (1)$$

The above expression essentially requires only 4 MAD instructions to evaluate:

$$A = ax + b \quad (2a)$$

$$B = Ax + c \quad (2b)$$

$$C = Bx + d \quad (2c)$$

$$D = Cx + e = y \quad (2d)$$

In general, for an n-$^{th}$ order polynomial $$f(x) = a_0 x^n + a_1 x^{n-1} + \ldots + a_k x^{n-k} + a_{k+1} \quad (3)$$

the evaluation of the polynomial can be efficiently carried out by performing n MAD operations, with each operation containing new coefficients $a_i$, where $i = 0, \ldots, k$.

When the polynomial expression is such that the power terms may be arranged to have an increment of two, the evaluation of the polynomial may be efficiently computed using the basic operation $A^2 \times B+C$ instead of $A \times B+C$. The operation is referred to as square multiply-add operation or SMAD. If the SMAD is implemented as a basic computational unit, the evaluation of such a polynomial using the SMAD may be more efficiently performed than using the MAD. For example, the polynomial:

$$f(x)=ax^8+bx^6+cx^4+dx^2+e \quad (4)$$

still needs 8 MAD operations. The above expression may be rewritten as:

$$f(x)=(((ax^2+b)x^2+c)x^2+d)x^2+e \quad (5)$$

The above expression requires only 4 SMAD instructions to evaluate:

$$A=ax^2+b \quad (6a)$$

$$B=Ax^2+c \quad (6b)$$

$$C=Bx^2+d, \quad (6c)$$

$$D=Cx^2+e=f(x) \quad (6e)$$

In general, the enhanced MAD or the SMAD instructions provide twice computational efficiency compared to the MAD instructions. Many extended functions may be approximated by polynomials with terms having powers in increment of two. One such type of extended function is the trigonometric functions. For example, the sine function may be approximated by:

$$\sin(x)=x-a_0x^3+a_1x^5-a_2x^7 \quad (7)$$

The cosine function may be approximated by:

$$\cos(x)=1-b_0x^2+b_1x^4-b_2x^6 \quad (8)$$

The SMAD also provides computational efficiency when calculating algebraic functions such as inverse (1/x), square root, and reciprocal square root using the Newton-Raphson method. The Newton-Raphson method is an iterative approximation which takes an initial, low precision, guess value. After each iteration, the precision is doubled, and the result from the current iteration is used as the initial guess in the next iteration. For practical area savings measures, it is desired to keep the table of the initial guess values very small and trade off the area savings for additional iterations through the Newton-Raphson technique. A common equation used to approximate an inverse is:

$$x_i=x_{i-1}(2-ax_{i-1}) \quad (9)$$

Using the MAD unit, each iteration for the above equation takes two instructions:

$$\text{First MAD: } z=2a*x_{i-1} \quad (10a)$$

$$\text{Second MAD: } xi=z*x_{i-1}+0 \quad (10b)$$

However, with the enhanced MAD or SMAD operation, it is possible to evaluate each Newton-Raphson iteration with a single instruction. This may be performed by re-arranging equation (9) as follows:

$$x=2x_{i-1}-ax^2_{i-1} \quad (7)$$

In the above equation, the multiplication of 2 by x may be achieved by a simple iteration of the exponent of x. Each iteration of the Newton-Raphson process doubles the precision of the initial guess. By reducing the number of instructions required to compute each iteration by half compared to a MAD unit, it is possible to keep the same guess table and double the overall throughput, or keep the same throughput and reduce the size of the initial guess table by half.

FIG. 1A is a diagram illustrating a processing system 10 in which one embodiment of the invention can be practiced. The system 10 includes a processor unit 15, a floating-point unit (FPU) 20, a memory controller hub (MCH) 25, a main memory 30, an input/output controller hub (IOH) 40, an interconnect 45, a mass storage device 50, and input/output (I/O) devices $47_1$ to $47_K$.

The processor unit 15 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The FPU 20 is a co-processor that performs floating-point operations for vector processing. It may have direct interface to the processing unit 15 and may share system resources with the processing unit 15 such as memory space. The processing unit 15 and the FPU 20 may exchange instructions and data including vector data and FP instructions. The FPU 20 may also be viewed as an input/output (I/O) processor that occupies an address space of the processing unit 15. It may also be interfaced to the MCH 25 instead of directly to the processor unit 15. It uses a highly scalable architecture with a FP pipeline to compute extended functions using an enhanced MAD unit. In particular, the FPU 20 may be used to efficiently compute trigonometric functions or algebraic functions (e.g., inverse, square root, reciprocal square root), or any function that may be approximated by a polynomial containing terms with powers in increment of two or by the Newton-Raphson method.

The MCH 25 provides control and configuration of memory and input/output devices such as the main memory 30 and the ICH 40. The MCH 25 may be integrated into a chipset that integrates multiple functionalities such as graphics, media, isolated execution mode, host-to-peripheral bus interface, memory control, power management, etc. The MCH 25 or the memory controller functionality in the MCH 25 may be integrated in the processor unit 15. In some embodiments, the memory controller, either internal or external to the processor unit 15, may work for all cores or processors in the processor unit 15. In other embodiments, it may include different portions that may work separately for different cores or processors in the processor unit 15.

The main memory 30 stores system code and data. The main memory 30 is typically implemented with dynamic random access memory (DRAM), static random access memory (SRAM), or any other types of memories including those that do not need to be refreshed. The main memory 30 may be accessible to the processor unit 15 or both of the processor unit 15 and the FPU 20.

The ICH 40 has a number of functionalities that are designed to support I/O functions. The ICH 40 may also be integrated into a chipset together or separate from the MCH 25 to perform I/O functions. The ICH 40 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, etc.

The interconnect 45 provides interface to peripheral devices. The interconnect 45 may be point-to-point or connected to multiple devices. For clarity, not all the interconnects are shown. It is contemplated that the interconnect 45 may include any interconnect or bus such as Peripheral Component Interconnect (PCI), PCI Express, Universal Serial Bus (USB), and Direct Media Interface (DMI), etc.

The mass storage device 50 stores archive information such as code, programs, files, data, and applications. The mass storage device 50 may include compact disk (CD) read-only memory (ROM) 52, digital video/versatile disc (DVD) 53, floppy drive 54, and hard drive 56, and any other magnetic or optic storage devices. The mass storage device 50 provides a mechanism to read machine-accessible media. The I/O devices $47_1$ to $47_K$ may include any I/O devices to perform I/O functions. Examples of I/O devices $47_1$ to $47_K$ include controller for input devices (e.g., keyboard, mouse, trackball, pointing device), media card (e.g., audio, video, graphic), network card, and any other peripheral controllers.

Figure 1B:
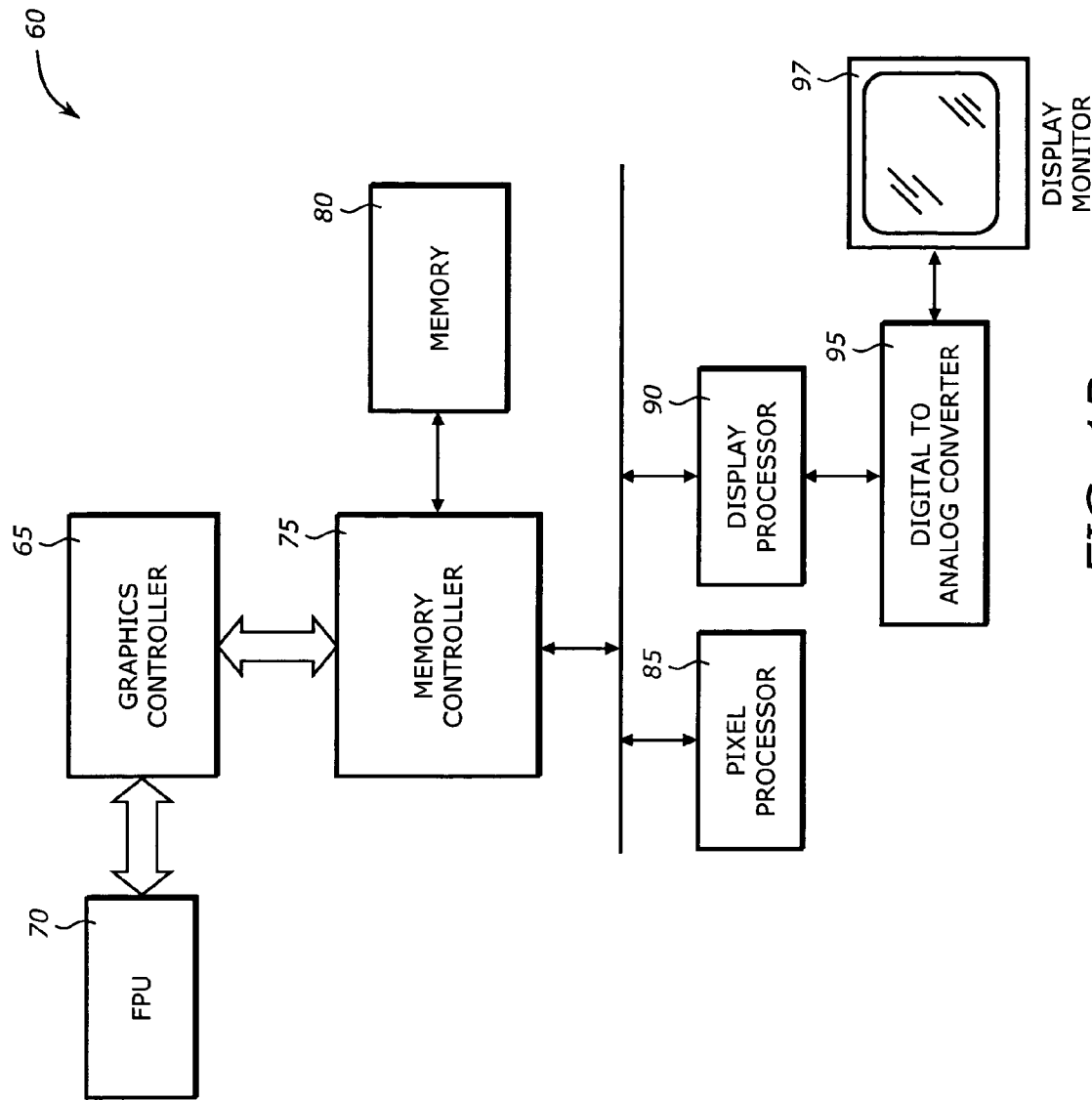
FIG. 1B is a diagram illustrating a graphics system in which one embodiment of the invention can be practiced.

FIG. 1B is a diagram illustrating a graphics system 60 in which one embodiment of the invention can be practiced. The graphics system 60 includes a graphics controller 65, a floating-point unit (FPU) 70, a memory controller 75, a memory 80, a pixel processor 85, a display processor 90, a digital-to-analog converter (DAC) 95, and a display monitor.

The graphics controller 65 is any processor that has graphic capabilities to perform graphics operations such as fast line drawing, two-dimensional (2-D) and three-dimensional (3-D) graphic rendering functions, shading, anti-aliasing, polygon rendering, transparency effect, color space conversion, alpha-blending, chroma-keying, etc. The FPU 70 is essentially similar to the FPU 20 shown in FIG. 1A. It performs floating-point operations on the graphic data. In particular, it efficiently computes the trigonometric or algebraic functions as discussed above. It may receive FP instructions and FP vector or scalar inputs from, and return the FP results to the graphics controller 65. The memory controller 75 performs memory control functions similar to the MCH 25 in FIG. 1A. The memory 80 includes SRAM or DRAM memory devices to store instructions and graphic data processed by the graphic controller 65 and the FPU 70.

The pixel processor 85 is a specialized graphic engine that can perform specific and complex graphic functions such as geometry calculations, affine conversions, model view projections, 3-D clipping, etc. The pixel processor 85 is also interfaced to the memory controller 75 to access the memory 80 and/or the graphic controller 65. The display processor 90 processes displaying the graphic data and performs display-related functions such as palette table look-up, synchronization, backlight controller, video processing, etc. The DAC 95 converts digital display digital data to analog video signal to the display monitor 97. The display monitor 97 is any display monitor that displays the graphic information on the screen for viewing. The display monitor may be a Cathode Ray Tube (CRT) monitor, a television (TV) set, a Liquid Crystal Display (LCD), a Flat Panel, or a Digital CRT.

Figure 2:
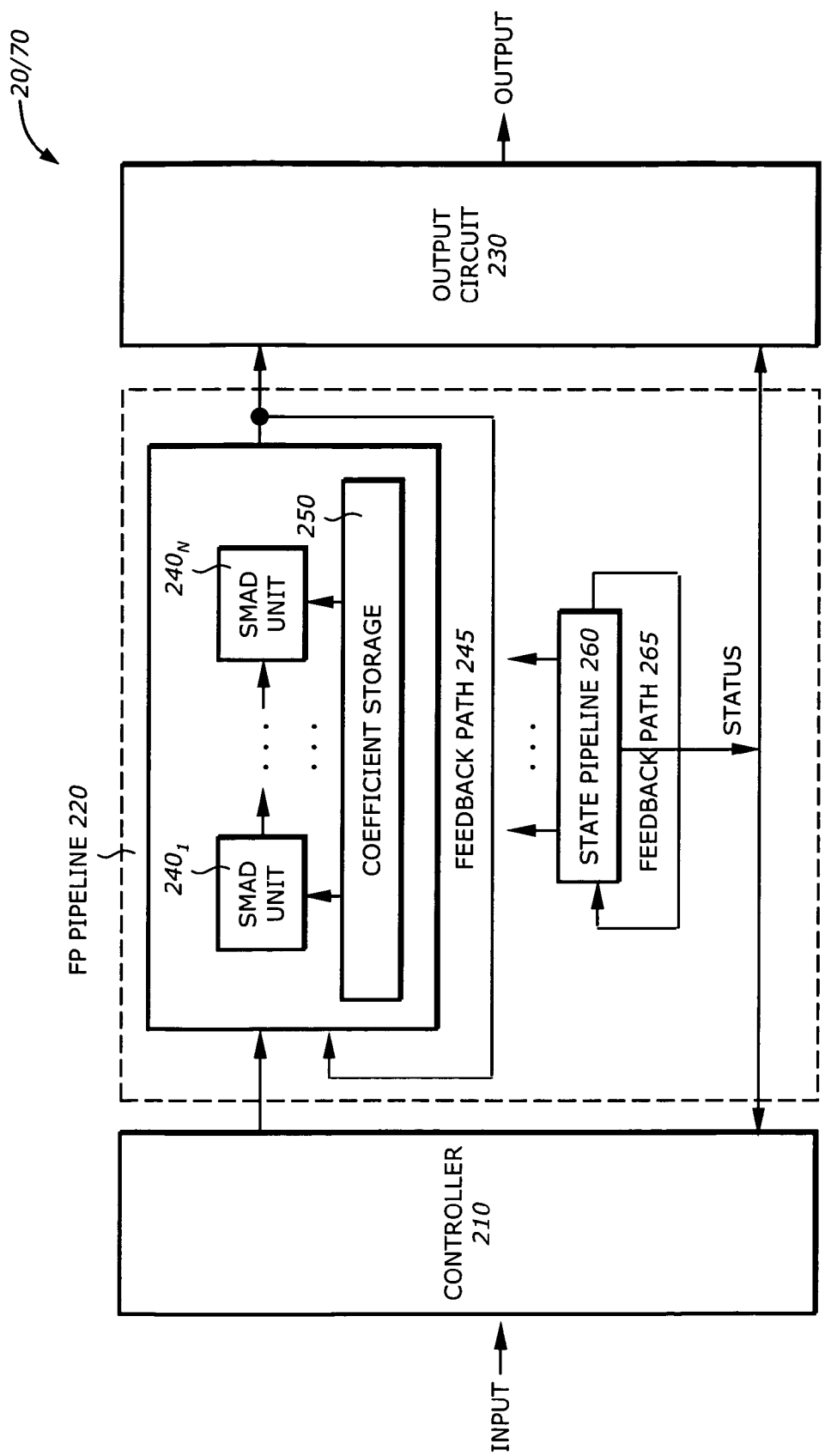
FIG. 2 is a diagram illustrating a FP unit (FPU) according to one embodiment of the invention.

FIG. 2 is a diagram illustrating the FPU 20/70 shown in FIGS. 1A and 1B according to one embodiment of the invention. The FPU 20/70 includes a controller 210, a FP pipeline 220, and an output circuit 230.

The controller 210 controls issuing an instruction operating on an input vector. The input vector may be provided by an external unit or processor such as the processor unit 15 (FIG. 1A) or the graphics controller 65 (FIG. 1B). The controller 210 may include an input queue to store a number of input vectors and instructions. Its depth may be any suitable depth according to the throughput and processing requirements. It may be implemented by a first in first out (FIFO) or any other storage architecture. Each input vector may include N scalar components. Each scalar component may be a FP number.

The controller circuit 210 dispatches the input vector obtained from the input queue and issues the instruction associated with the input vector according to a status of the FP pipeline 220.

The FP pipeline 220 computes an extended FP function. It generates a status to the controller 210 and an FP result to the output circuit 230. The extended FP function may be any one of transcendental functions such as trigonometric functions (e.g., tangent, sine, cosine, inverse tangent, inverse sine, inverse cosine) that may be approximated by polynomial approximation, or an algebraic function that may be approximated by the Newton-Raphson technique. The FP pipeline includes N SMAD units $240_1$ to $240_N$ where N is any positive integer including 1, a coefficient storage 250, and a state pipeline 260. The N SMAD units $240_1$ to $240_N$ are connected in series. The output of the last SMAD unit provides the FP result and is connected to the input of the first SMAD unit through a feedback path 245. This arrangement allows for the N SMAD units $240_1$ to $240_N$ to compute a series of square multiply-add operations. The coefficient storage 250 stores any coefficients for the approximation including the initial guess values for the Newton-Raphson technique. The state pipeline 260 provides control of rounding mode, exception handling, and status of the FP pipeline. The status indicates if the instruction is being re-circulated through the feedback path 245. The status is used by the controller 210 and the output circuit 230 to control issuing instructions. The state pipeline 260 has a feedback path 265 to correspond to the feedback path 245. Its latency is matched with the latency of the N SMAD units $240_1$ to $240_N$.

The output circuit 230 writes or assembles the FP result into an output vector. It obtains the FP result which may correspond to the computational result of a scalar component of the input vector and writes to an output buffer at an appropriate scalar position. When all the scalar results are written to the output buffer, the complete output vector is read out by an external unit or processor such as the processor unit 15 or the graphics controller 65.

Figure 3:
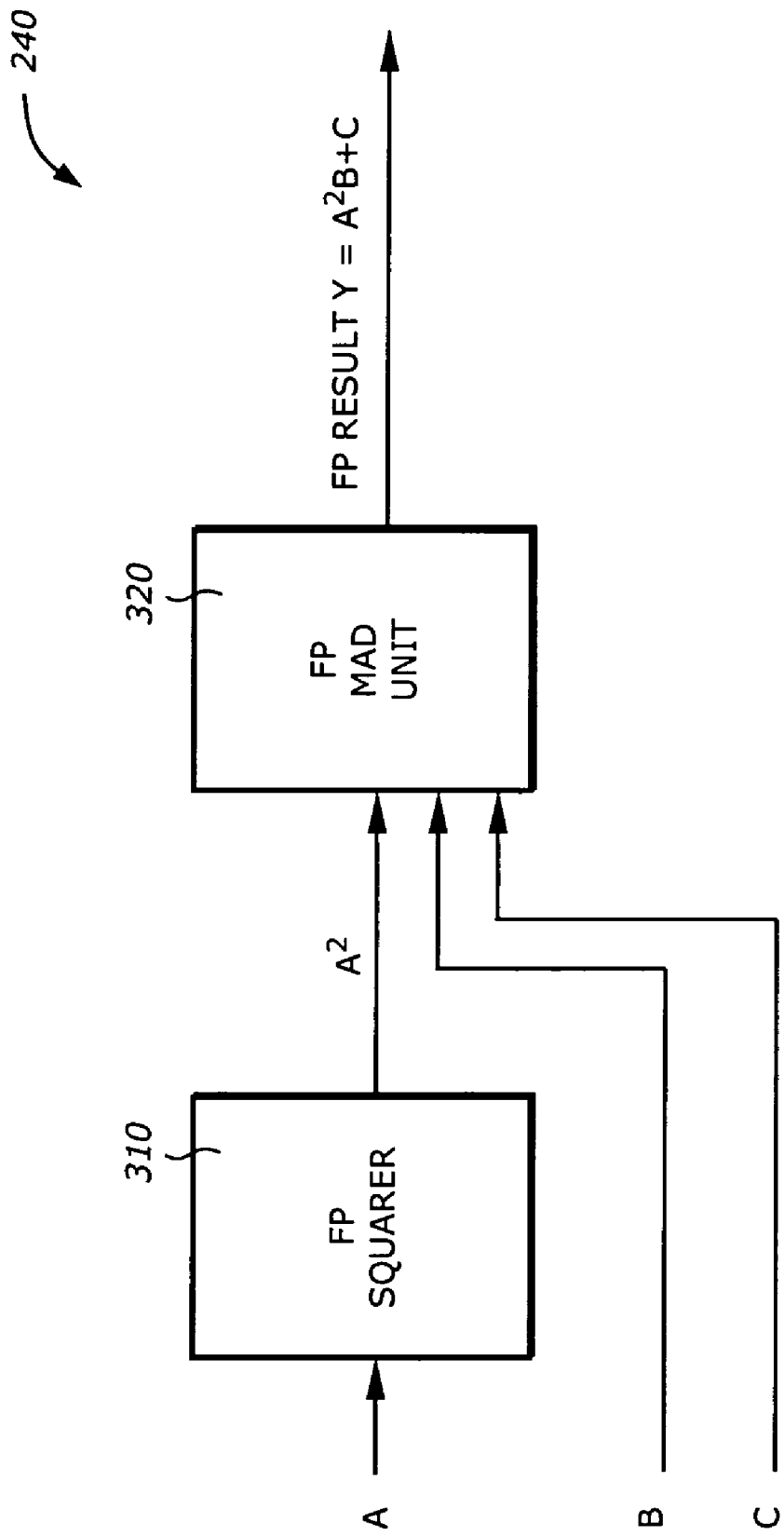
FIG. 3 is a diagram illustrating a square multiply-add (MAD) unit according to one embodiment of the invention.

FIG. 3 is a diagram illustrating the square multiply-add (SMAD) unit 240 shown in FIG. 2 according to one embodiment of the invention. The SMAD unit 240 includes an FP squarer 310 and a FP MAD unit 320. It is noted that the specific architecture of the FP MAD unit 320 depends on applications and system requirements. The description below is for illustrative purposes only.

FP additions and multiplications are different from fixed-point additions and multiplications because the FP numbers are represented with a mantissa and an exponent. In essence, the operations performed on a FP number usually include operations on the mantissa and the exponent parts separately. A FP addition typically consists of a subtraction of exponents, a shifting of mantissas by an amount equal to the exponent difference, addition or subtraction of the mantissas, a shifting of the result (on subtraction) to leave it in normalized form, and a rounding of the result. A FP multiplication typically consists of a multiplication of the mantissas, an addition of the exponents, and normalization and rounding. Detection of overflows and underflows may be included if necessary.

The FP squarer 310 receives a first argument, a FP number A and perform a square operation to generate an intermediate argument, or $A^2$. The first argument A and the intermediate argument $A^2$ are FP numbers. The first argument A has a first mantissa $A_m$ and a first exponent $A_e$. Similarly, the intermediate argument $A^2$ has an intermediate mantissa $A^2_m$ and intermediate exponent $A^2_e$.

The FP multiply-add (MAD) unit 320 receives the intermediate argument $A^2$, a second argument B, and a third argument C. It performs a multiply-and-add operation on the intermediate argument $A^2$, the second argument B, and the third argument C to produce a FP result. The FP result has a result mantissa and a result exponent. The second argument B has a second mantissa $B_m$ and a second exponent $B_e$. Similarly, the third argument C has a third mantissa $C_m$ and a third exponent $C_e$. The FP result Y is therefore computed as: $Y=A^2 \times B+C$.

Figure 4:
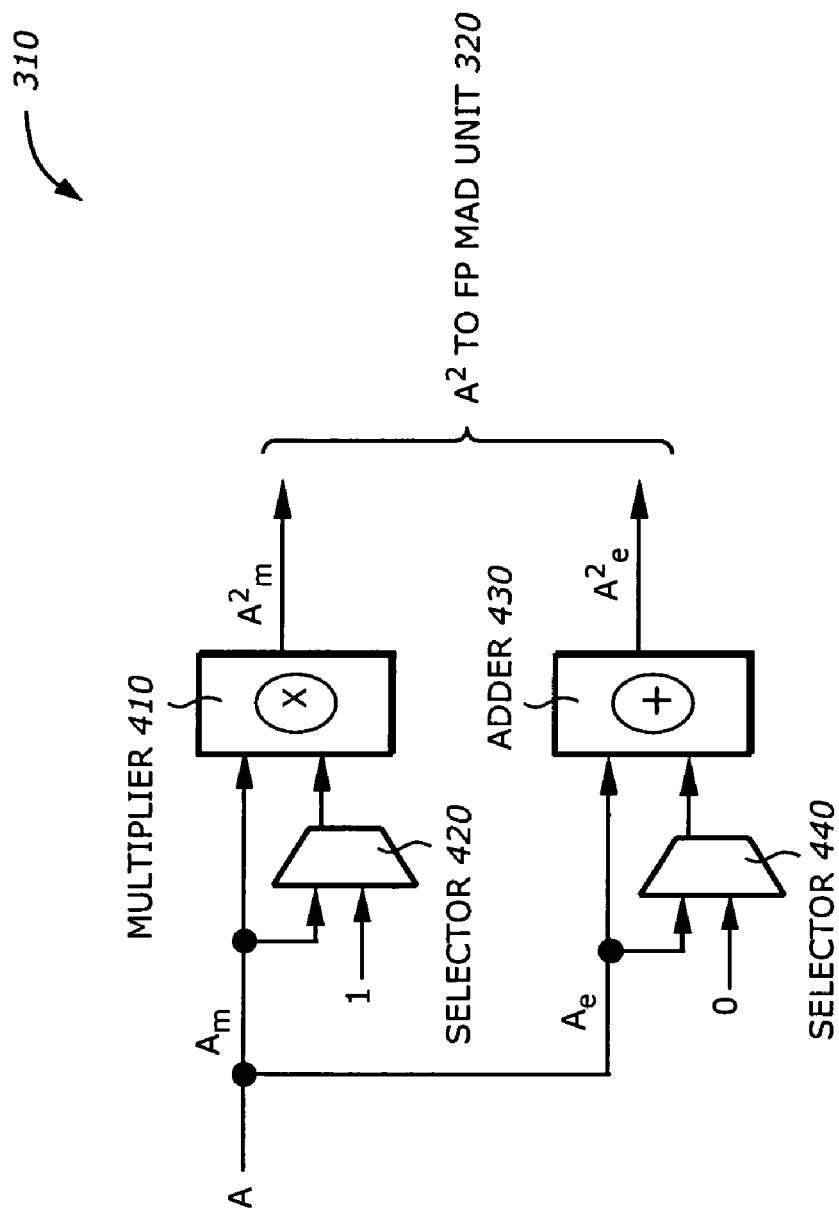
FIG. 4 is a diagram illustrating FP squarer according to one embodiment of the invention.

FIG. 4 is a diagram illustrating the FP squarer 310 according to one embodiment of the invention. The FP squarer 310 includes a multiplier 410, a selector 420, an adder 430, and a selector 440.

The multiplier 410 multiplies the first mantissa with a mantissa multiplicand selected from the first mantissa and a first constant to generate the intermediate mantissa $A^2_m$. The selector 420 provides the mantissa multiplicand from the first mantissa $A_m$ and the first constant. In one embodiment, this first constant is one (1).

The adder adds the first exponent with an exponent addend selected from the first exponent $A_e$ and a second constant to generate the intermediate exponent $A^2_e$. The selector 440 provides the exponent addend from the first exponent $A_e$ and the second constant. In one embodiment, the second constant is zero (0).

The first and the second constants represent a FP number 1.0 and 0 respectively. When the selectors 420 and 440 are set to select these two constants, the FP squarer 310 essentially performs a FP multiplication of A with 1, resulting in the first argument A with no change to the mantissa or exponent. This is provided so that the SMAD may be programmed or configured to work as the MAD without the squaring.

Figure 5:
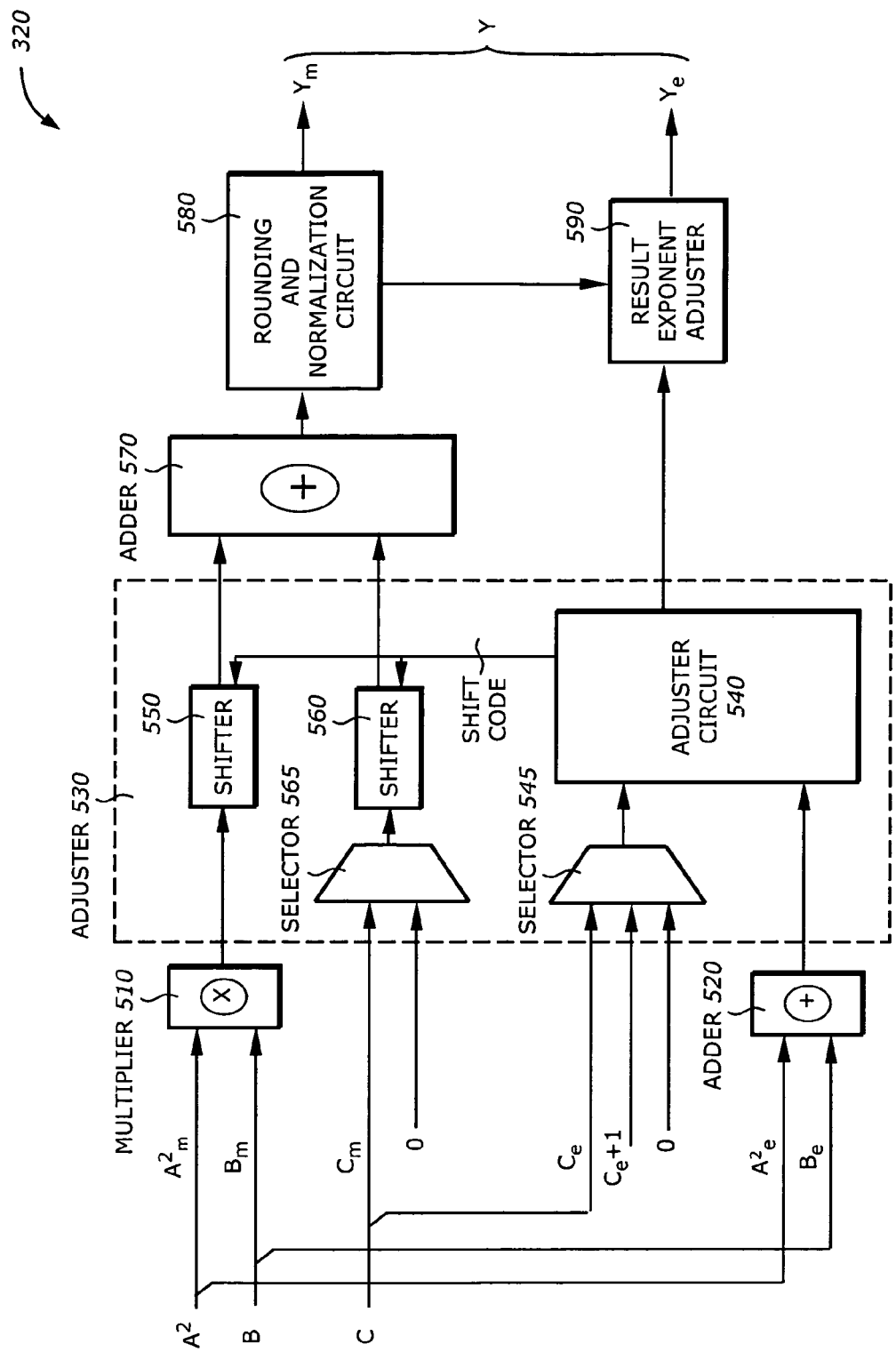
FIG. 5 is a diagram illustrating FP MAD unit according to one embodiment of the invention.

FIG. 5 is a diagram illustrating the FP MAD unit 320 shown in FIG. 3 according to one embodiment of the invention. The FP MAD unit 320 includes a multiplier 510, an adder 520, an adjuster 530, an adder 570, a rounding and normalization circuit 580, and a result exponent adjuster 590.

The multiplier 510 multiplies the intermediate mantissa $A^2_m$ with the second mantissa $B_m$ to produce a mantissa product. This mantissa product goes to the adjuster 530 to be adjusted before going to the adder 570. The adder 520 adds the intermediate exponent $A^2_e$ with the second exponent $B_e$ to generate an exponent sum The adjuster 530 adjusts the mantissa product and the third mantissa using the exponent sum. It includes an adjuster circuit 540, two shifters 550 and 560, and two selectors 565 and 545. The adjuster circuit 540 essentially compares the exponents, determines the difference and generates a shift amount to shift the mantissas. It generates a mantissa shift code and a adjusted exponent sum using the exponent sum and one of the third exponent $C_e$, an incremented third exponent $C_e+1$, and a third constant, as selected by the selector 545. The incremented third exponent $C_e+1$ may be generated from the third exponent $C_e$ using an adder or an incrementer. The shifter 550 shifts the mantissa product using the mantissa shift code to generate the adjusted mantissa product to go to the adder 570. The shifter 560 shifts one of the third mantissa $C_m$ and a fourth constant using the mantissa shift code, as selected by the selector 565, to generate the adjusted third mantissa. The adjusted third mantissa goes to the adder 570. In one embodiment, the third and fourth constants are zero.

The adder 570 adds the adjusted mantissa product and the adjusted third mantissa to produce a mantissa sum. The rounding and normalization circuit 580 rounds and normalizes the mantissa sum to generate the result mantissa $Y_m$. It also provides a rounding and normalization code to adjust the result exponent. The result exponent adjuster 590 generates the result exponent $Y_e$ using the adjusted exponent sum and the rounding and normalization code.

Figure 6:
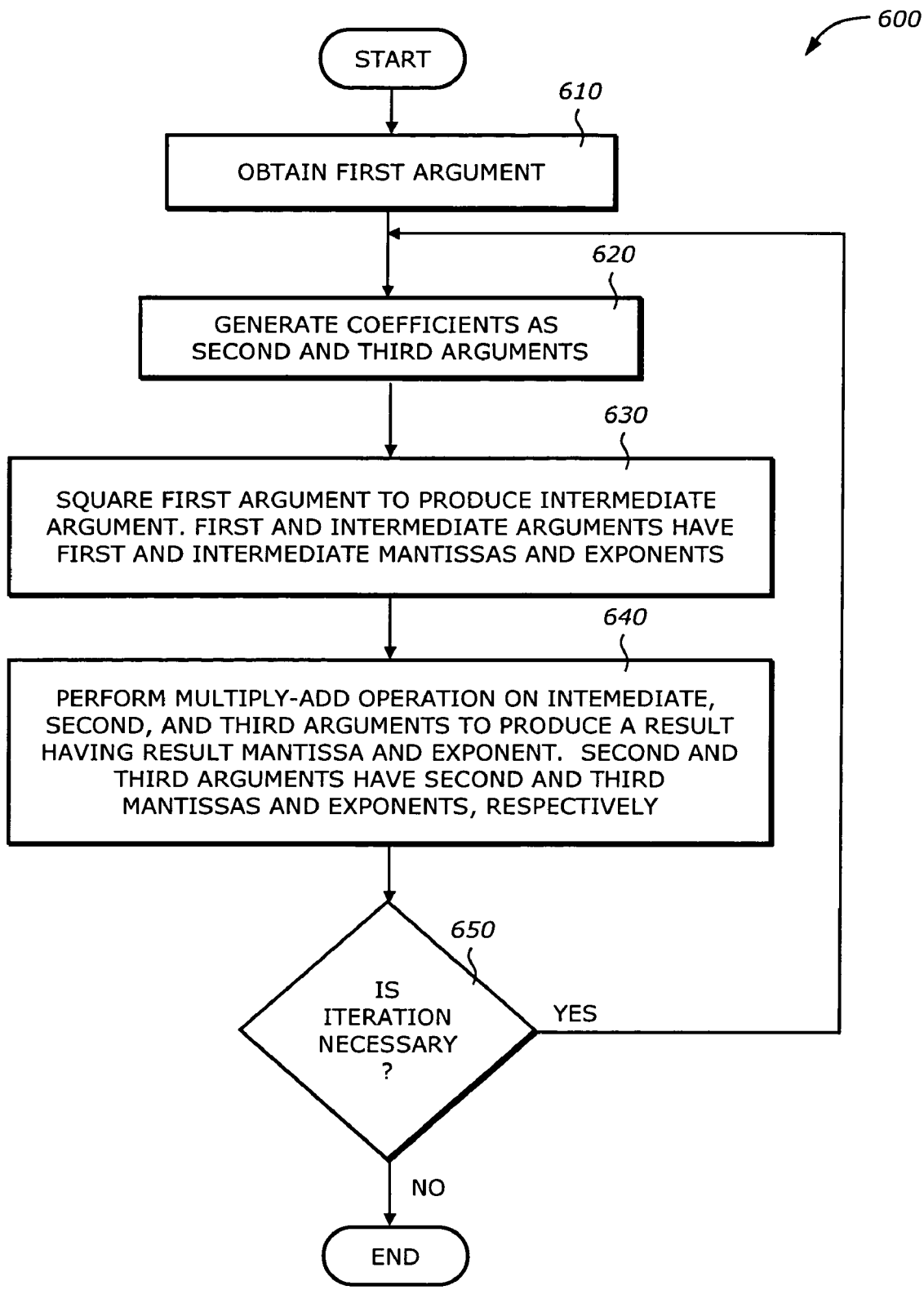
FIG. 6 is a flowchart illustrating a process to perform FP computations according to one embodiment of the invention.

FIG. 6 is a flowchart illustrating a process 600 to perform FP computations according to one embodiment of the invention.

Upon START, the process 600 obtains the first argument (Block 610). Then, the process 600 generates coefficients for the polynomial as second and third arguments (Block 620). Next, the process 600 squares the first argument to produce an intermediate argument (Block 630). The first and intermediate arguments have first and intermediate mantissas and exponents, respectively. Then, the process 600 performs a multiply-and-add operation on the intermediate argument, a second argument, and a third argument to produce a result (Block 640). The result has a result mantissa and a result exponent. The second and third arguments have second and third mantissas and exponents, respectively. The process 600 determines if iteration is necessary. If so, the process 600 returns back to Block 620 to continue generating coefficients. Otherwise, the process 600 is terminated.

Figure 7:
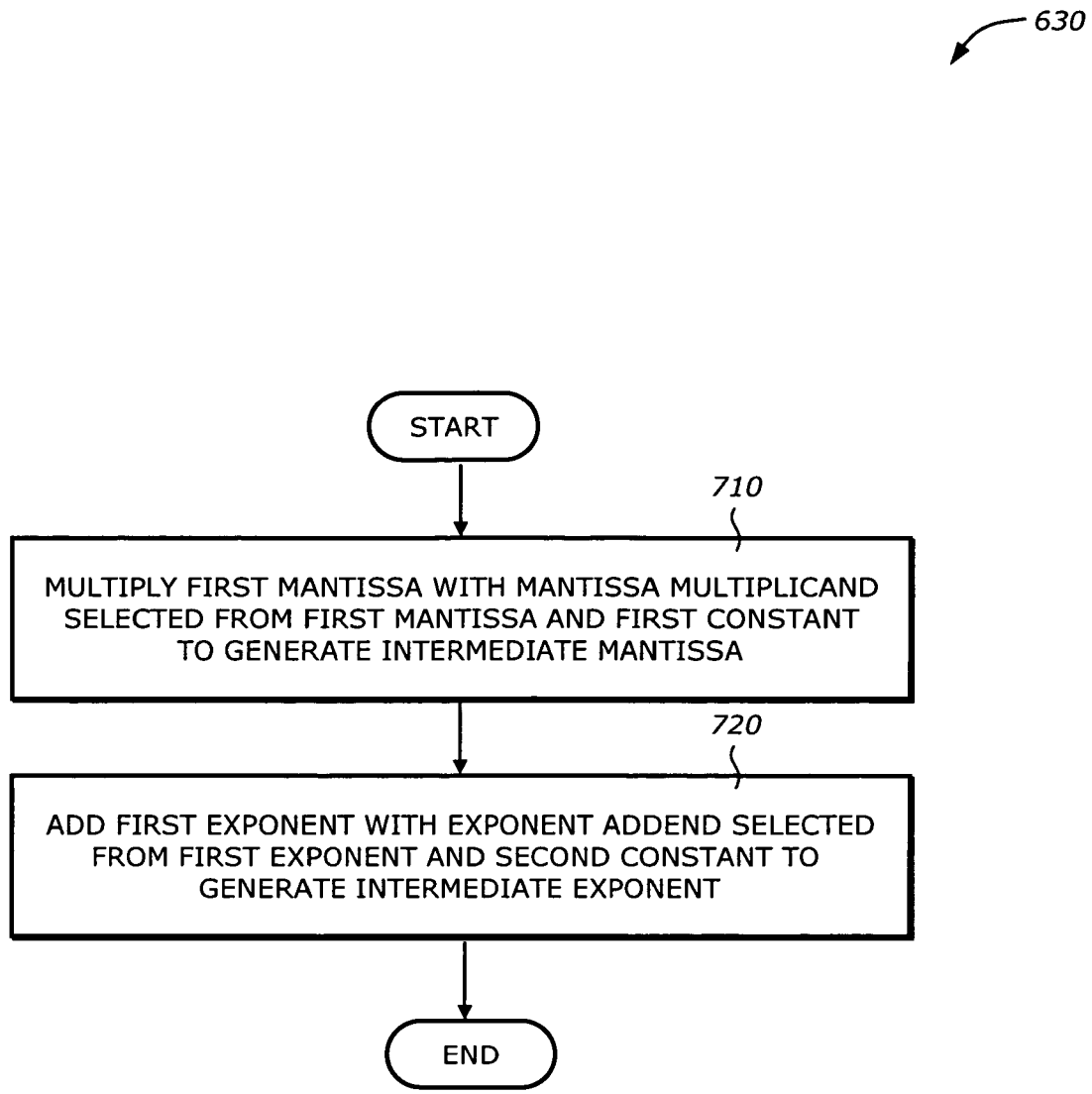
FIG. 7 is a flowchart illustrating a process to square according to one embodiment of the invention.

FIG. 7 is a flowchart illustrating the process 630 to square according to one embodiment of the invention.

Upon START, the process 630 multiplies the first mantissa with a mantissa multiplicand selected from the first mantissa and a first constant to generate the intermediate mantissa (Block 710). Next, the process 630 adds the first exponent with an exponent addend selected from the first exponent and a second constant to generate the intermediate exponent (Block 720) and is then terminated.

Figure 8:
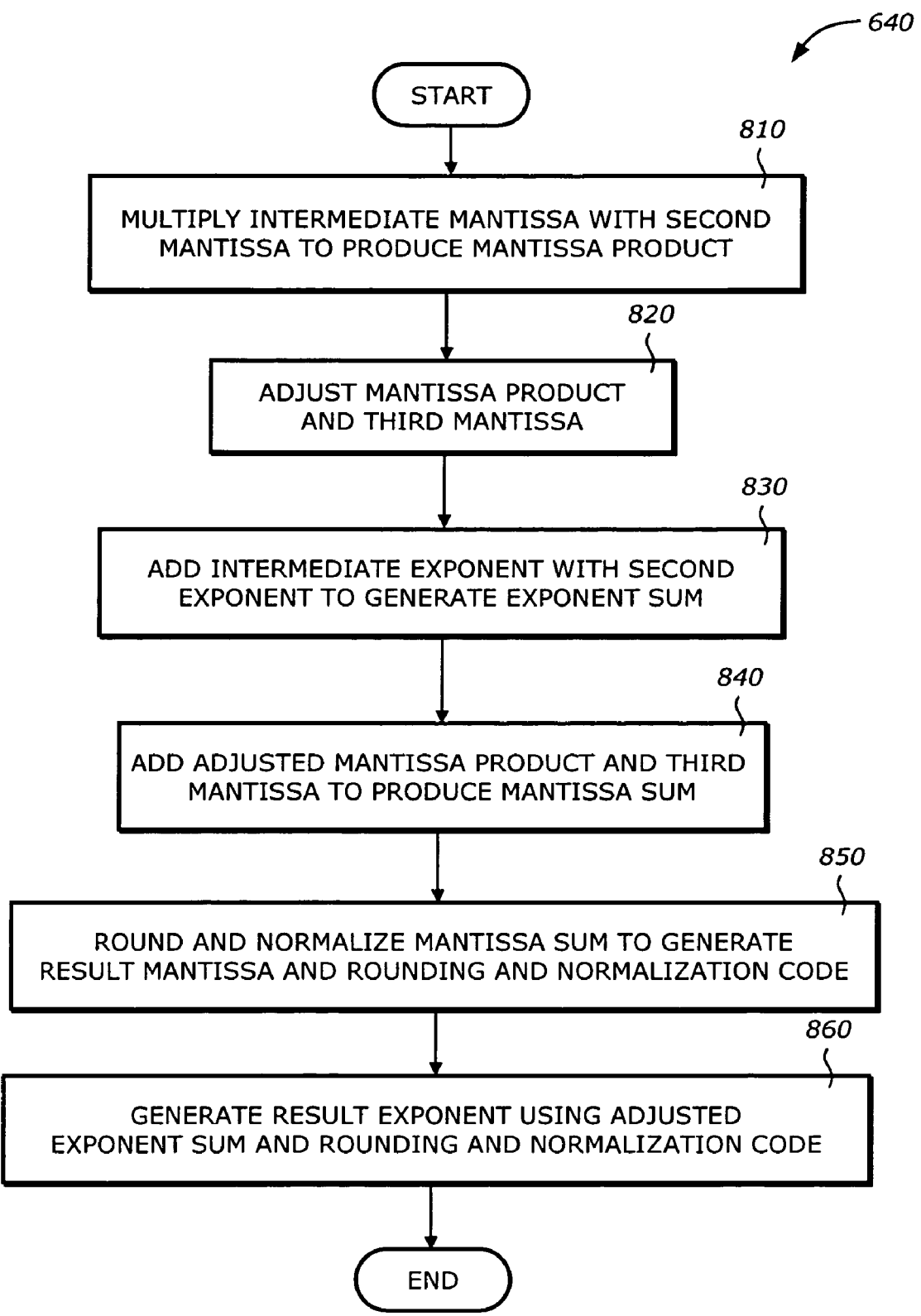
FIG. 8 is a flowchart illustrating a process to perform multiply-add operation according to one embodiment of the invention.

FIG. 8 is a flowchart illustrating the process 640 to perform multiply-add operation according to one embodiment of the invention.

Upon START, the process 640 multiplies the intermediate mantissa with the second mantissa to produce a mantissa product (Block 810). Next, the process 640 adjusts the mantissa product and the third mantissa (Block 820). Then, the process 640 adds the intermediate exponent with the second exponent to generate an exponent sum (Block 830). Next, the process 640 adds the adjusted mantissa product and third mantissa to produce a mantissa sum (Block 840).

Then, the process 640 rounds and normalizes the mantissa sum to generate the result mantissa and provides a rounding and normalization code (Block 850). Next, the process 640 generates the result exponent using the adjusted exponent sum and the rounding and normalization code (Block 860) and is then terminated.

Figure 9:
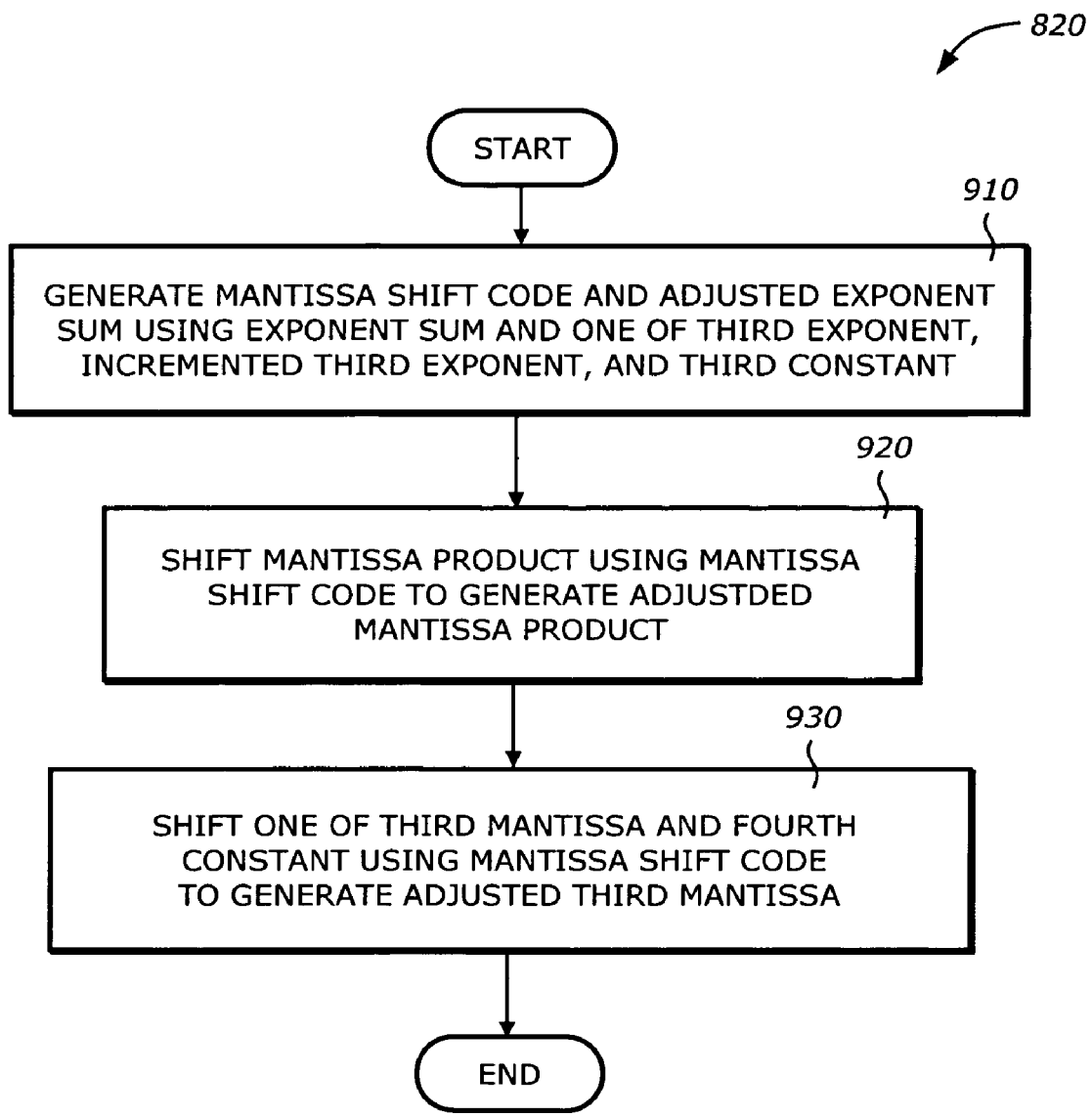
FIG. 9 is a flowchart illustrating a process to adjust the mantissa product according to one embodiment of the invention.

FIG. 9 is a flowchart illustrating the process 820 to adjust the mantissa product according to one embodiment of the invention.

Upon START, the process 820 generates a mantissa shift code and an adjusted exponent sum using the exponent sum and one of the third exponent, an incremented third exponent, and a third constant (Block 910). Then, the process 820 shifts the mantissa product using the mantissa shift code to generate the adjusted mantissa product (Block 920). Next, the process 820 shifts one of the third mantissa and a fourth constant using the mantissa shift code to generate the adjusted third mantissa and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    a floating-point (FP) squarer to square a first argument to produce an intermediate argument, the first and intermediate arguments having first and intermediate mantissas and exponents; and
    a FP multiply-add (MAD) unit coupled to the FP squarer to perform a multiply-and-add operation on the intermediate argument, a second argument, and a third argument to produce a result having a result mantissa and a result exponent, the second and third arguments having second and third mantissas and exponents, respectively.

2. The apparatus of claim 1 wherein the FP squarer comprises:
    a first multiplier to multiply the first mantissa with a mantissa multiplicand selected from the first mantissa and a first constant, the first multiplier generating the intermediate mantissa; and
    a first adder to add the first exponent with an exponent addend selected from the first exponent and a second constant, the first adder generating the intermediate exponent.

3. The apparatus of claim 2 wherein the FP MAD unit comprises:
    a second multiplier to multiply the intermediate mantissa with the second mantissa to produce a mantissa product;
    an adjuster coupled to the multiplier to adjust the mantissa product and the third mantissa;
    a second adder coupled to the first adder to add the intermediate exponent with the second exponent to generate an exponent sum; and
    a third adder coupled to the mantissa adjuster to add the adjusted mantissa product and third mantissa to produce a mantissa sum.

4. The apparatus of claim 3 wherein the adjuster comprises:
    an adjuster circuit to generate a mantissa shift code and an adjusted exponent sum using the exponent sum and one of the third exponent, an incremented third exponent, and a third constant; and
    a first shifter to shift the mantissa product using the mantissa shift code to generate the adjusted mantissa product;
    a second shifter to shift one of the third mantissa and a fourth constant using the mantissa shift code to generate the adjusted third mantissa.

5. The apparatus of claim 4 further comprising:
    a rounding and normalization circuit coupled to the third adder to round and normalize the mantissa sum to generate the result mantissa, the rounding and normalization circuit providing a rounding and normalization code; and
    a result exponent adjuster coupled to the adjuster circuit to generate the result exponent using the adjusted exponent sum and the rounding and normalization code.

6. The apparatus of claim 4 wherein the first, second, third, and fourth constants are unity, zero, zero, and zero, respectively.

7. The apparatus of claim 1 wherein the first, second, and third arguments are used in one of a polynomial approximation of an extended function and a Newton-Raphson iteration.

8. A method comprising:
    squaring a first argument to produce an intermediate argument, the first and intermediate arguments having first and intermediate mantissas and exponents; and
    performing a multiply-and-add operation on the intermediate argument, a second argument, and a third argument to produce a result having a result mantissa and a result exponent, the second and third arguments having second and third mantissas and exponents, respectively, the first, second, and third arguments being stored in corresponding storage elements.

9. The method of claim 8 wherein squaring comprises:
    multiplying the first mantissa with a mantissa multiplicand selected from the first mantissa and a first constant to generate the intermediate mantissa; and
    adding the first exponent with an exponent addend selected from the first exponent and a second constant, the first adder to generate the intermediate exponent.

10. The method of claim 9 wherein performing the multiply-and-add operation comprises:
    multiplying the intermediate mantissa with the second mantissa to produce a mantissa product;
    adjusting the mantissa product and the third mantissa;
    adding the intermediate exponent with the second exponent to generate an exponent sum; and
    adding the adjusted mantissa product and third mantissa to produce a mantissa sum.

11. The method of claim 10 wherein the adjusting comprises:
    generating a mantissa shift code and an adjusted exponent sum using the exponent sum and one of the third exponent, an incremented third exponent, and a third constant; and
    shifting the mantissa product using the mantissa shift code to generate the adjusted mantissa product;
    shifting one of the third mantissa and a fourth constant using the mantissa shift code to generate the adjusted third mantissa.

12. The method of claim 11 further comprising:
    rounding and normalizing the mantissa sum to generate the result mantissa and provide a rounding and normalization code; and
    generating the result exponent using the adjusted exponent sum and the rounding and normalization code.

13. The method of claim 11 wherein the first, second, third, and fourth constants are unity, zero, zero, and zero, respectively.

14. The method of claim 9 wherein the first, second, and third arguments are used in one of a polynomial approximation of an extended function and a Newton-Raphson iteration.

15. A system comprising:
    a graphics controller to process graphic data;
    a memory coupled to the graphics controller to store the graphic data; and
    a floating-point unit (FPU) coupled to the graphics controller to perform floating-point operations on the graphic data, the FPU including a controller, a FP pipeline, and an output circuit, the FP pipeline comprising:
        a floating-point (FP) squarer to square a first argument to produce an intermediate argument, the first and intermediate arguments having first and intermediate mantissas and exponents, and
        a FP multiply-add (MAD) unit coupled to the FP squarer to perform a multiply-and-add operation on the intermediate argument, a second argument, and a third argument to produce a result having a result mantissa and a result exponent, the second and third arguments having second and third mantissas and exponents, respectively.

16. The system of claim 15 wherein the FP squarer comprises:
   a first multiplier to multiply the first mantissa with a mantissa multiplicand selected from the first mantissa and a first constant, the first multiplier generating the intermediate mantissa; and
   a first adder to add the first exponent with an exponent addend selected from the first exponent and a second constant, the first adder generating the intermediate exponent.

17. The system of claim 16 wherein the FP MAD unit comprises:
   a second multiplier to multiply the intermediate mantissa with the second mantissa to produce a mantissa product;
   an adjuster coupled to the multiplier to adjust the mantissa product and the third mantissa;
   a second adder coupled to the first adder to add the intermediate exponent with the second exponent to generate an exponent sum; and
   a third adder coupled to the mantissa adjuster to add the adjusted mantissa product and third mantissa to produce a mantissa sum.

18. The system of claim 17 wherein the adjuster comprises:
   an adjuster circuit to generate a mantissa shift code and an adjusted exponent sum using the exponent sum and one of the third exponent, an incremented third exponent, and a third constant; and
   a first shifter to shift the mantissa product using the mantissa shift code to generate the adjusted mantissa product;
   a second shifter to shift one of the third mantissa and a fourth constant using the mantissa shift code to generate the adjusted third mantissa.

19. The system of claim 18 further comprising:
   a rounding and normalization circuit coupled to the third adder to round and normalize the mantissa sum to generate the result mantissa, the rounding and normalization circuit providing a rounding and normalization code; and
   a result exponent adjuster coupled to the adjuster circuit to generate the result exponent using the adjusted exponent sum and the rounding and normalization code.

20. The system of claim 18 wherein the first, second, third, and fourth constants are unity, zero, zero, and zero, respectively.

* * * * *